(12) United States Patent
Harada (10) Patent No.: US 11,331,718 B2
(45) Date of Patent: May 17, 2022

(54) METHOD FOR CONVEYING CONTAINER, DEVICE FOR CONVEYING CONTAINER, AND METHOD FOR CONVEYING LADLE

(71) Applicant: HITACHI METALS, LTD., Tokyo (JP)

(72) Inventor: Takuya Harada, Saitama (JP)

(73) Assignee: HITACHI METALS, LTD., Tokyo (JP)

( * ) Notice: Subject to any disclaimer, the term of this patent is extended or adjusted under 35 U.S.C. 154(b) by 350 days.

(21) Appl. No.: 16/488,412

(22) PCT Filed: Dec. 11, 2017

(86) PCT No.: PCT/JP2017/044353
§ 371 (c)(1),
(2) Date: Aug. 23, 2019

(87) PCT Pub. No.: WO2018/154921
PCT Pub. Date: Aug. 30, 2018

(65) Prior Publication Data
US 2020/0009648 A1   Jan. 9, 2020

(30) Foreign Application Priority Data

Feb. 27, 2017   (JP) .............................. JP2017-034768

(51) Int. Cl.
*B22D 41/12*  (2006.01)
*B22D 41/06*  (2006.01)
(Continued)

(52) U.S. Cl.
CPC ............. *B22D 41/12* (2013.01); *B22D 41/06* (2013.01); *B65G 35/06* (2013.01); *B65G 43/00* (2013.01); *B65G 2813/023* (2013.01)

(58) Field of Classification Search
CPC ........ B22D 41/06; B22D 41/12; B65B 57/00; B65G 35/06; B65G 43/00
See application file for complete search history.

(56) References Cited

U.S. PATENT DOCUMENTS

| 4,491,074 A * | 1/1985 | Ackermann | B61D 3/20 |
| | | | 105/164 |
| 8,062,578 B2 | 11/2011 | Noda et al. | |
| 2017/0217695 A1* | 8/2017 | Puveendiran | B25J 5/02 |

FOREIGN PATENT DOCUMENTS

| JP | S51-105017 U | 8/1976 |
| JP | H09-010924 A | 1/1997 |

(Continued)

OTHER PUBLICATIONS

Feb. 27, 2018 Search Report issued in International Patent Application No. PCT/JP2017/044353.
(Continued)

*Primary Examiner* — Kevin E Yoon
(74) *Attorney, Agent, or Firm* — Oliff PLC (57) ABSTRACT

A method for calculating a conveyance velocity at which oscillation of a liquid surface is suppressed in conveying a container in which a liquid is accommodated, e.g., a ladle in which molten metal is accommodated. In a graph of conveyance velocity versus conveyance time, an upwardly convex parabola and a downwardly convex parabola having vertical symmetry are prepared in advance, the downwardly convex parabola and the upwardly convex parabola are smoothly connected to form an acceleration curve, the upwardly convex parabola and the downwardly convex parabola are smoothly connected to form a deceleration curve, and the conveyance velocity is obtained from the acceleration curve and the deceleration curve smoothly connected where the slope thereof is zero.

8 Claims, 10 Drawing Sheets

(51) Int. Cl.
*B65G 35/06* (2006.01)
*B65G 43/00* (2006.01)

(56) References Cited

FOREIGN PATENT DOCUMENTS

| | | | | |
|---|---|---|---|---|
| JP | 09277025 A | * | 10/1997 | |
| JP | 2006-283786 A | | 10/2006 | |
| WO | WO-2014174977 A1 | * | 10/2014 | ............. B22D 39/00 |

OTHER PUBLICATIONS

Dec. 24, 2021 Office Action issued in Indian Patent Application No. 201947038245.

* cited by examiner

1) $0 \leq t \leq \dfrac{t_0}{4}$  $v(t) = a \cdot t^2$

2) $\dfrac{t_0}{4} \leq t \leq \dfrac{3}{4}t_0$  $v(t) = -a \cdot \left[\left(t - \dfrac{t_0}{2}\right)^2 - \dfrac{t_0^2}{8}\right]$

3) $\dfrac{3}{4}t_0 \leq t \leq t_0$  $v(t) = a \cdot (t - t_0)^2$

1) $0 \leq t \leq \dfrac{t_1}{4}$ : $v(t) = b \cdot t^2$

2) $\dfrac{t_1}{4} \leq t \leq \dfrac{t_1}{2}$ : $v(t) = -b \cdot \left[ \left( t - \dfrac{t_1}{2} \right)^2 - \dfrac{t_1^2}{8} \right]$ 3) $\dfrac{t_1}{2} \leq t \leq \dfrac{t_1}{2} + t_2$ : $v(t) = \dfrac{1}{8} b \cdot t_1^2$ 4) $\dfrac{t_1}{2} + t_2 \leq t \leq \dfrac{3}{4} t_1 + t_2$ : $v(t) = -b \cdot \left[ \left( t - \dfrac{t_1}{2} - t_2 \right)^2 - \dfrac{t_1^2}{8} \right]$ 5) $\dfrac{3}{4} t_1 + t_2 \leq t \leq t_1 + t_2$ : $v(t) = b \cdot (t - t_1 - t_2)^2$ $$L = \int_0^{t_1+t_2} v(t) dt = \dfrac{b \cdot (t_1^3 + 2t_1^2 \cdot t_2)}{16}$$

$$\therefore b = \dfrac{16L}{t_1^3 + 2t_1^2 \cdot t_2}$$

METHOD FOR CONVEYING CONTAINER, DEVICE FOR CONVEYING CONTAINER, AND METHOD FOR CONVEYING LADLE

TECHNICAL FIELD OF THE INVENTION

The present invention relates to a method for conveying a container containing a liquid, and more particularly to a method for conveying a ladle containing molten metal.

BACKGROUND OF THE INVENTION

An example of conveyance of a container containing a liquid is a conveyance of a ladle in a casting line. During this conveyance, after the ladle is conveyed to a pouring position, oscillations may be generated on a surface of molten metal in the ladle. If such oscillations continue for a long time, measurement of the ladle weight becomes unstable, which may affect feeding accuracy of the molten metal.

It has been known that such oscillations of a liquid surface can be suppressed by making a curve of acceleration and deceleration in a graph of velocity versus time of ladle conveyance an S shape. It has been also known that such an S-shaped curve can be calculated from a liquid simulation (Patent Document 1 for example).

RELATED ART

Patent Documents

[Patent Document 1] Japanese Unexamined Patent Application Publication No. H9-10924 (JP-A-H9-10924)

SUMMARY OF THE INVENTION

Problems to be Solved by the Invention

As described in Patent Document 1, the calculation of the curve from a liquid simulation requires complex calculations using a plurality of parameters, such as conditions of the ladle and the molten metal, conveyance distance, conveyance time, and so on. However, it is often required in a casting line to change a ladle for another or to change the conveyance distance according to positions of molds. In such cases, it is required to change the above parameters according to the conditions and to do the complex calculations over again. That is, applying a liquid simulation to a conveyance of a ladle in a casting line may complicate setting of the conveyance velocity.

On the other hand, in a casting line, there is sometimes a case in which oscillations of a liquid surface during a pouring operation after conveying the ladle can be tolerated to an extent. That is, there is a case in which a pouring operation can be done while the liquid surface is not completely stationary. Thus, rather than to calculate the optimum conveyance velocity by using a liquid simulation, it is sometimes preferable to be able to more easily calculate the conveyance velocity at which the liquid surface oscillations are suppressed to an extent.

An object of the present invention is to provide a method for conveying a container and a method for conveying a ladle, which facilitates calculation of a conveyance velocity at which liquid surface oscillations are suppressed in conveying the container containing a liquid, or the ladle containing molten metal.

Means for Solving Problems

A first invention is a method for conveying a container. The method starts a conveyance by accelerating the container containing a liquid in a horizontal direction and decelerates the container to complete the conveyance. A conveyance velocity v(t) of the container, which is a function of time t, can be represented by:

Formula 1 when $0 \le t \le (t_0/4)$ $$v(t) = a \cdot t^2 \qquad \text{[Formula 1]}$$

Formula 2 when $(t_0/4) \le t \le (3t_0/4)$ $$v(t) = -a \cdot \left[ \left(t - \frac{t_0}{2}\right)^2 - \frac{t_0^2}{8} \right] \qquad \text{[Formula 2]}$$

Formula 3 when $(3t_0/4) \le t \le (t_0)$ $$v(t) = a \cdot (t - t_0)^2 \qquad \text{[Formula 3]}$$

wherein $t_0$ represents a time for conveying the container and a represents a constant.

In this case, the constant a may be determined as $\alpha_{max}/2$ wherein $\alpha_{max}$ represents a maximum value of a rate of change of acceleration of the container at which liquid surface oscillations after conveying the container can be suppressed within a tolerable range.

Also, when L represents a conveyance distance and $V_{max}$ represents a velocity limit of the container that is tolerable in the conveyance of the container, in a case in which a maximum value of the conveyance velocity v(t) among Formula 1 to 3 is equal to or less than the velocity limit $V_{max}$, the conveyance time v(t) of the container may be set by using Formulae 1 to 3; and in a case in which the maximum value of the conveyance velocity v(t) among Formula 1 to 3 is more than the velocity limit $V_{max}$, a total time for conveying the container in acceleration and in deceleration may be $t_1$, a time for conveying the container at a constant speed may be $t_2$, and the constant may be b, and, in addition, the conveyance velocity v(t) of the container, which is a function of time t, may be represented by:

Formula 4 when $0 \le t \le (t_1/4)$ $$v(t) = b \cdot t^2 \qquad \text{[Formula 4]}$$

Formula 5 when $(t_1/4) \le t \le (t_1/2)$ $$v(t) = -b \cdot \left[ \left(t - \frac{t_1}{2}\right)^2 - \frac{t_1^2}{8} \right] \qquad \text{[Formula 5]}$$

Formula 6 when $(t_1/2) \le t \le (t_1/2) + t_2$ $$v(t) = \tfrac{1}{8} b \cdot t_1^2 \qquad \text{[Formula 6]}$$

Formula 7 when $(t_1/2) + t_2 \le t \le (3t_1/4) + t_2$ $$v(t) = -b \cdot \left[ \left(t - \frac{t_1}{2} - t_2\right)^2 - \frac{t_1^2}{8} \right] \qquad \text{[Formula 7]}$$

Formula 8 when $(3t_1/4) + t_2 \le t \le t_1 + t_2$ $$v(t) = b \cdot (t - t_1 - t_2)^2 \qquad \text{[Formula 8]}$$

wherein the conveyance velocity v(t) may be set from the conveyance time $t_1$ and the conveyance time $t_2$ that are calculated from the constant a, the velocity limit $V_{max}$, and the conveyance distance L where the constant b is the constant a and the constant speed of Formula 6 is the velocity limit $V_{max}$.

Also, the first invention may be a method for conveying a container including steps of starting a conveyance by accelerating the container containing a liquid in a horizontal direction, conveying the container at a constant speed, and decelerating the container to complete the conveyance. The conveyance velocity v(t) of the container, which is a function of time t, can be represented by:

Formula 4 when $0 \le t \le (t_1/4)$ $$v(t)=b \cdot t^2 \qquad \text{[Formula 4]}$$

Formula 5 when $(t_1/4) \le t \le (t_1/2)$ $$v(t) = -b \cdot \left[\left(t - \frac{t_1}{2}\right)^2 - \frac{t_1^2}{8}\right] \qquad \text{[Formula 5]}$$

Formula 6 when $(t_1/2) \le t \le (t_1/2)+t_2$ $$v(t) = \frac{1}{8} b \cdot t_1^2 \qquad \text{[Formula 6]}$$

Formula 7 when $(t_1/2)+t_2 \le t \le (3t_1/4)+t_2$ $$v(t) = -b \cdot \left[\left(t - \frac{t_1}{2} - t_2\right)^2 - \frac{t_1^2}{8}\right] \qquad \text{[Formula 7]}$$

Formula 8 when $(3t_1/4)+t_2 \le t \le t_1+t_2$ $$v(t) = b \cdot (t - t_1 - t_2)^2 \qquad \text{[Formula 8]}$$

wherein '$t_1$' represents a total time for conveying the container in acceleration and in deceleration, '$t_2$' represents a time for conveying the container at a constant speed, and 'b' represents a constant.

Also, the first invention may be a method for conveying a container, in which the liquid is a molten metal and the container is a tilting ladle.

A second invention is a conveyor control unit for conveying a container that starts conveying by accelerating the container containing a liquid in a horizontal direction and completes the conveyance after deceleration. The conveyor control unit includes a storage unit and a control unit. The storage unit can store a conveyance time $t_0$ of the container, a constant a, a maximum value of a rate of change of acceleration $\alpha_{max}$ at which liquid surface oscillations after conveying the container can be suppressed within a tolerable range. The storage unit can also store a conveyance velocity of the container v(t), which is a function of time t, as:

Formula 1 when $0 \le t \le (t_0/4)$ $$v(t) = a \cdot t^2 \qquad \text{[Formula 1]}$$

Formula 2 when $(t_0/4) \le t \le (3t_0/4)$ $$v(t) = -a \cdot \left[\left(t - \frac{t_0}{2}\right)^2 - \frac{t_0^2}{8}\right] \qquad \text{[Formula 2]}$$

Formula 3 when $(3t_0/4) \le t \le (t_0)$ $$v(t) = a \cdot (t - t_0)^2 \qquad \text{[Formula 3]}$$

The control unit calculates the constant a from the rate of change of acceleration αmax stored in the storage unit and can determine the conveyance velocity v(t) of the container.

Here, the storage unit can store a velocity limit $V_{max}$ for the container, which is a tolerable velocity in conveying the container, a total time $t_1$ for the container to be conveyed in acceleration and deceleration, a constant speed time $t_2$, and a constant b.

The storage unit can also store a conveyance velocity of the container v(t), which is a function of time t, as:

Formula 4 when $0 \le t \le (t_1/4)$ $$v(t)=b \cdot t^2 \qquad \text{[Formula 4]}$$

Formula 5 when $(t_1/4) \le t \le (t_1/2)$ $$v(t) = -b \cdot \left[\left(t - \frac{t_1}{2}\right)^2 - \frac{t_1^2}{8}\right] \qquad \text{[Formula 5]}$$

Formula 6 when $(t_1/2) \le t \le (t_1/2)+t_2$ $$v(t) = \frac{1}{8} b \cdot t_1^2 \qquad \text{[Formula 6]}$$

Formula 7 when $(t_1/2)+t_2 \le t \le (3t_1/4)+t_2$ $$v(t) = -b \cdot \left[\left(t - \frac{t_1}{2} - t_2\right)^2 - \frac{t_1^2}{8}\right] \qquad \text{[Formula 7]}$$

Formula 8 when $(3t_1/4)+t_2 \le t \le t_1+t_2$ $$v(t) = b \cdot (t - t_1 - t_2)^2 \qquad \text{[Formula 8]}$$

When a maximum value of the conveyance velocity v(t) among Formulae 1 to 3 is equal to or less than the velocity limit $V_{max}$, the control unit may be able to set the conveyance time v(t) of the container by using Formulae 1 to 3; and when the maximum value of the conveyance velocity v(t) among Formulae 1 to 3 is more than the velocity limit $V_{max}$, the control unit can set the conveyance time v(t) of the container by using Formulae 4 to 8, and, in addition, the control unit may be able to calculate the conveyance time $t_1$ and the conveyance time $t_2$ from the constant a, the velocity limit $V_{max}$, and the conveyance distance L where the constant b is equal to the constant a and the constant speed of Formula 6 is the velocity limit $V_{max}$.

Effects of the Invention

The present invention can provide a method for conveying a container, or a method for conveying a ladle, which facilitates calculation of a conveyance velocity at which liquid surface oscillations can be suppressed in conveying the container containing a liquid, or the ladle containing molten metal.

DESCRIPTION OF SOME EMBODIMENTS

Hereinafter, some embodiments of the present invention will be described with reference to the accompanying drawings. In the embodiments below, a method for conveying a liquid being contained in a container will be described by illustrating a conveyance of a ladle in a casting line.

First Embodiment

Figure 1:
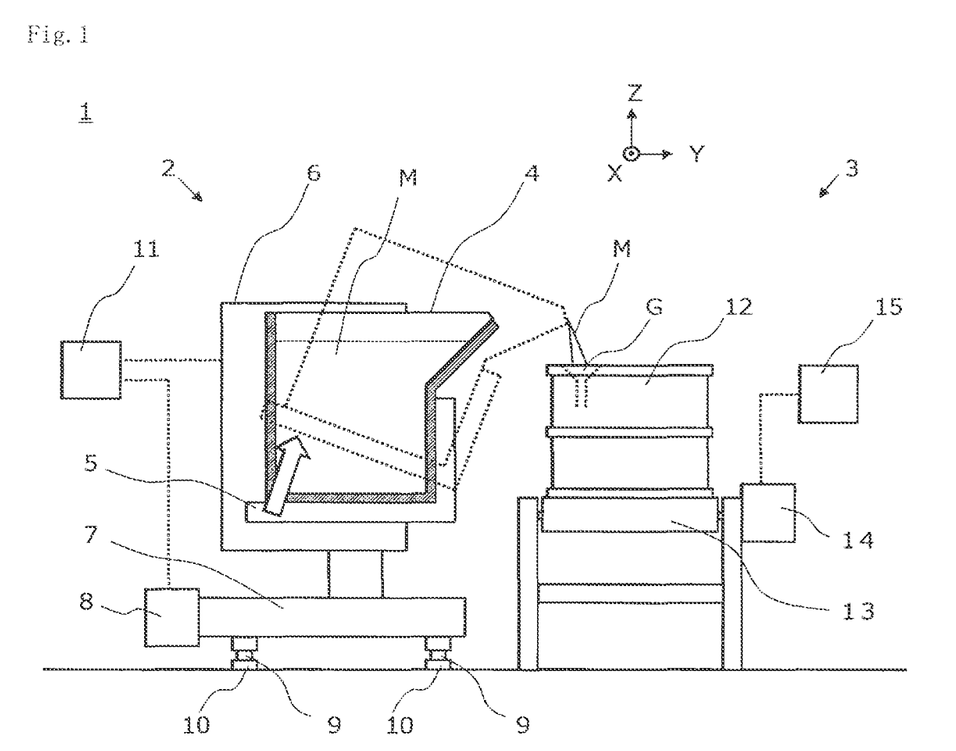
FIG. 1 is a schematic side view of a casting line for illustrating a first embodiment of the present invention.

As shown in FIG. 1, a casting line 1 includes a pouring apparatus 2 and a mold conveyor apparatus 3. The pouring apparatus 2 includes a ladle 4 containing a molten metal M, a fixing base 5 that supports the ladle 4, and a tilting mechanism 6 that supports the fixing base 5 and tilts the ladle 4 together with the fixing base 5. The tilting mechanism 6 is supported by a trolley 7, and a motor 8 drives wheels 9 to rotate so that the ladle 4 can be conveyed along rails 10 extending in an X direction in the drawing. Also, the tilting mechanism 6 and the motor 8 are electrically connected to a drive controller unit 11 so that the drive controller unit 11 can control the position and tilting of the ladle 4 in regard to the mold conveyor apparatus 3.

Also, the mold conveyor apparatus 3 includes a conveyor 13, which allows a mold 12 to move in the X direction in the drawing, and a conveyor motor 14, which drives the conveyor 13 so as to allow the mold 12 to be conveyed. The conveyor motor 14 is electrically connected to a conveyor control unit 15, which can control conveyance of the mold 12.

Next, a procedure for conveying the ladle 4 will be described with reference to FIG. 2.

Figure 2:
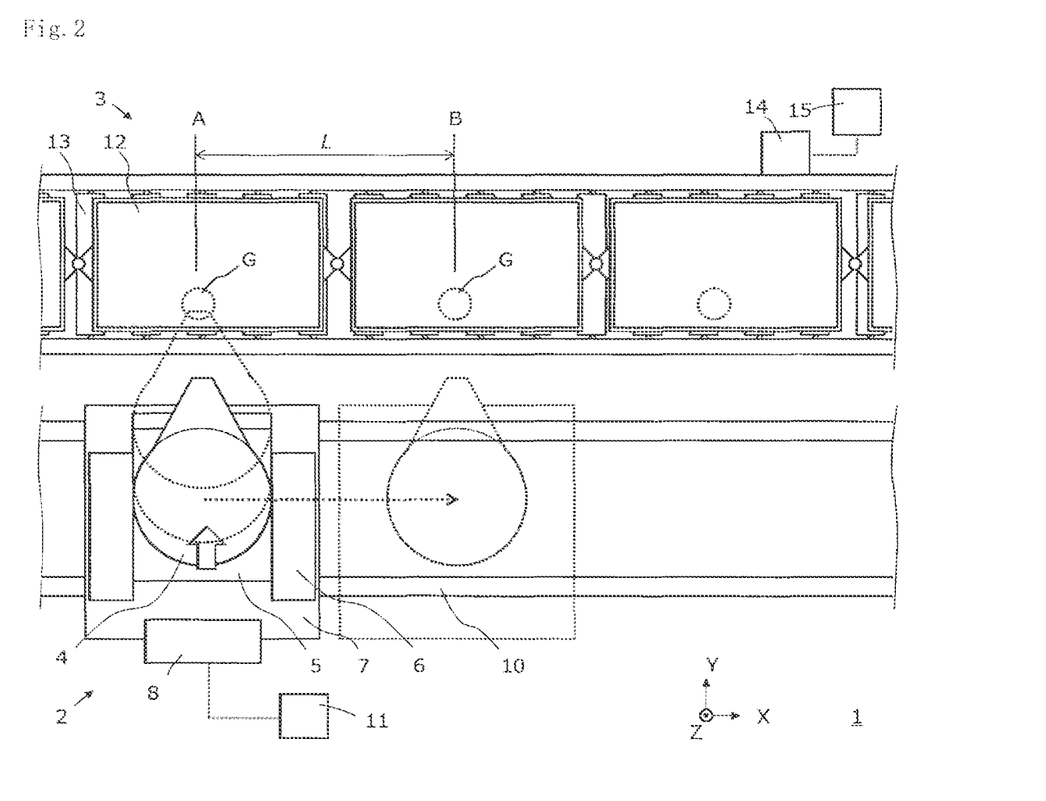
FIG. 2 is a schematic top view of the casting line for illustrating the first embodiment of the present invention.

First, the conveyor control unit 15 of the mold conveyor apparatus 3 drives the conveyor motor 14 to convey a plurality of the molds 12 placed on the conveyor 13 to predetermined positions (positions A and B in FIG. 2). Next, the drive controller unit 11 of the pouring apparatus 2 drives the motor 8 to rotate the wheels 9 and convey the pouring apparatus 2 along the rails 10 until the ladle 4 is positioned opposite to a gate G of the mold 12 (the position A in FIG. 2). Then, the drive controller unit 11 operates the tilting mechanism 6 to tilt the ladle 4 and feeds the molten metal M into the gate G of the mold 12. When pouring is finished, the drive controller unit 11 operates the tilting mechanism 6 once again to tilt the ladle 4 backwards.

After that, the drive controller unit 11 of the pouring apparatus 2 drives the motor 8 again to rotate the wheels 9 and convey the pouring apparatus 2 along the rails 10 until the ladle 4 is positioned opposite to the gate G of the next mold 12 (the position B in FIG. 2). Then, the molten metal is supplied into the gate G of the mold 12 through the same process as at the position A.

The acceleration and deceleration curves of the conveyance velocity versus time curve for the ladle 4 are set to be in S shapes according to formulae below so that liquid surface oscillations after conveying the ladle 4 from the position A to the position B can be suppressed.

Figure 3:
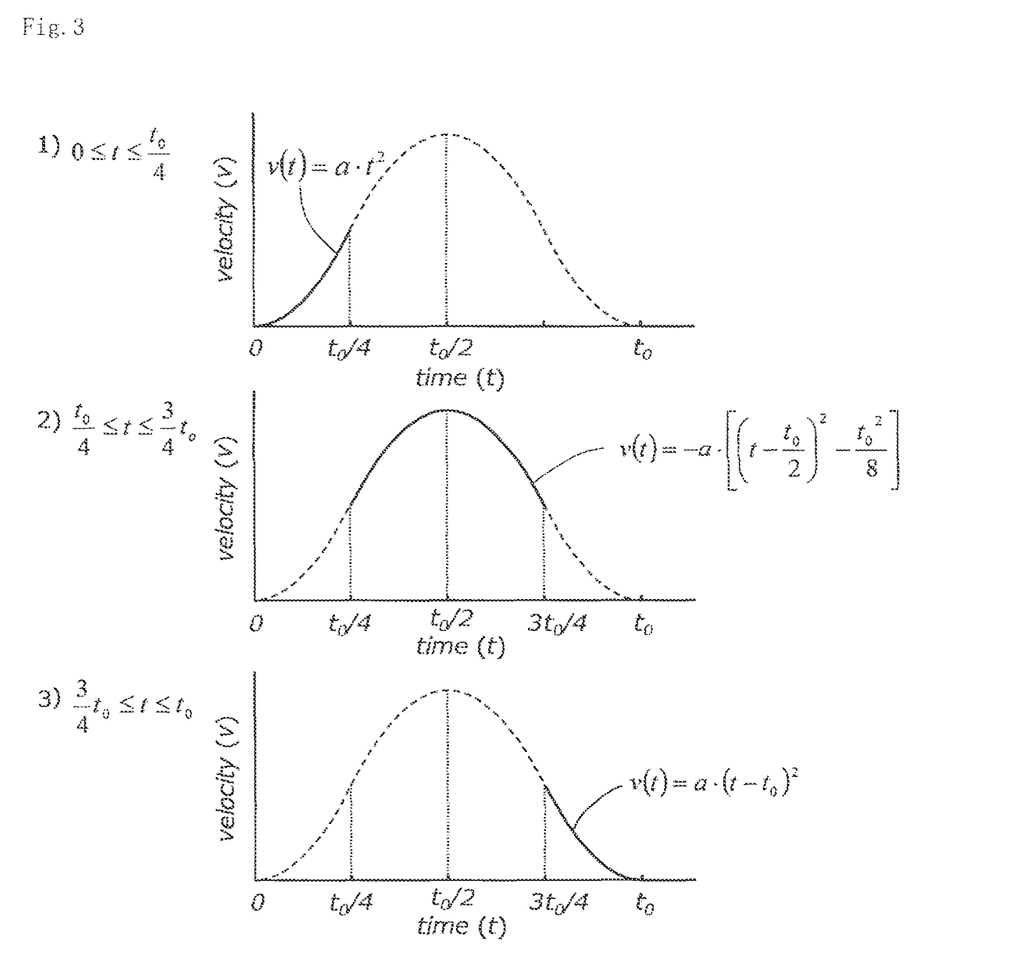
FIG. 3 is a view for illustrating a conveyance velocity of a ladle in the first embodiment of the present invention.

That is, a conveyance velocity v(t) of the ladle 4 (the velocity in the X direction in the drawing), which is a function of time t, can be obtained, as shown in FIG. 3, by:
Formula 1 when $0 \leq t \leq (t_0/4)$ $$v(t) = a \cdot t^2 \quad \text{[Formula 1]}$$

Formula 2 when $(t_0/4) \leq t \leq (3t_0/4)$ $$v(t) = -a \cdot \left[ \left(t - \frac{t_0}{2}\right)^2 - \frac{t_0^2}{8} \right] \quad \text{[Formula 2]}$$

Formula 3 when $(3t_0/4) \leq t \leq (t_0)$ $$v(t) = a \cdot (t - t_0)^2 \quad \text{[Formula 3]}$$

wherein $t_0$ represents a time for conveying the ladle 4 and a represents a constant.

In other words, in a graph of conveyance velocity versus conveyance time, an upwardly convex parabola and a downwardly convex parabola having vertical symmetry are prepared in advance, the downwardly convex parabola and the upwardly convex parabola are smoothly connected to form an acceleration curve, the upwardly convex parabola and the downwardly convex parabola are smoothly connected to form a deceleration curve, and the conveyance velocity v(t) shown by the above formulae is obtained from the acceleration curve and the deceleration curve smoothly connected where the slope thereof is zero.

The conveyance velocity v(t) of the ladle 4 according to the present embodiment is obtained by smoothly connecting the downwardly convex parabola represented by Formula 1 (FIG. 3 (1)) and the upwardly convex parabola represented by Formula 2 (FIG. 3 (2)) at a connection point $t=t_0/4$ with a slope $2at_0$ and by smoothly connecting the upwardly convex parabola represented by Formula 2 and the downwardly convex parabola represented by Formula 3 (FIG. 3 (3)) at a connection point $t=3t_0/4$ with a slope $-2at_0$. Accordingly, the curves in an acceleration section ($0 \leq t \leq t_0/2$) and a deceleration section ($t_0/2 \leq t \leq t_0$) can be easily set to smooth S shapes, and thus the liquid surface oscillations of the molten metal after conveying the ladle 4 can be suppressed.

Figure 4:
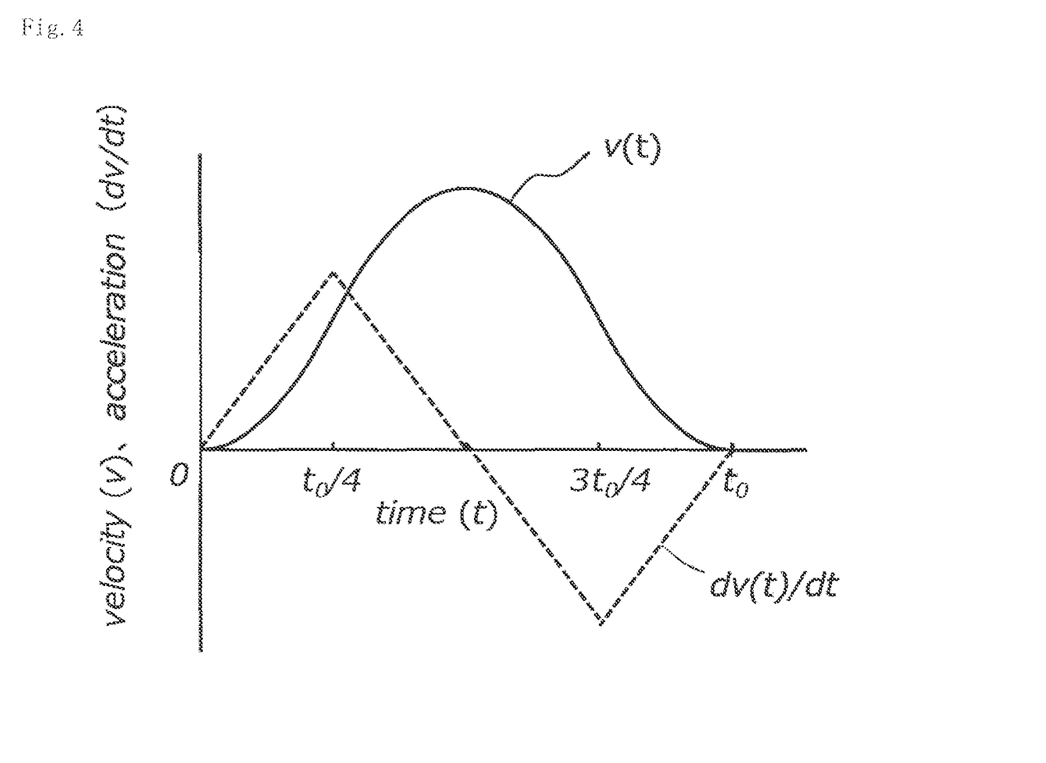
FIG. 4 is a view for illustrating a relationship between the conveyance velocity and an acceleration of the ladle in the first embodiment of the present invention.

Also, as shown in FIG. 4, in the above conveyance velocity v(t), change in time of the curve, i.e. an acceleration dv(t)/dt of the ladle 4, is linear with a slope 2a or −2a. This allows force tilting the liquid surface during the conveyance to change linearly, and thus liquid surface oscillations after conveying the ladle 4 can be further suppressed.

As a function for an S-shaped curve, a sigmoid function is known. This function has a curve both ends of which approach its asymptotes gradually, and thus the slope of the curve never becomes zero. Thus, if this curve is adapted for the S-shaped curve of the acceleration curve or the deceleration curve, it is required to decide where to set the both ends of the S shape, i.e. which positions approaching the asymptotes to be set for the both ends. Thus, the S shape may change according to the setting positions for the both ends, which increases parameters to determine the S shape, and, as a result, setting of the acceleration or deceleration curves becomes complicated.

On the other hand, the S-shaped curve according to the present embodiment is a curve connecting symmetric parabolas, and thus the both ends may be set at positions where the slope of the curve is zero. And setting the positions for the both ends can uniquely determine the shape of the parabolas, accordingly determining the shape of the S-shaped curve uniquely. This can set the S shape of the acceleration curve and the deceleration curve easily and thus set the conveyance velocity easily.

Although parabolas (a quadratic function) are used in the present embodiment, a higher function such as a cubic or quartic function may be used as necessary. The higher the function is, the more smooth S-shaped curves can be. However, using the quadratic function for the velocity change allows a rate of change of acceleration to be a linear function. This facilitates velocity setting using a tolerable maximum rate of change of acceleration, which will be described below.

Figure 5:
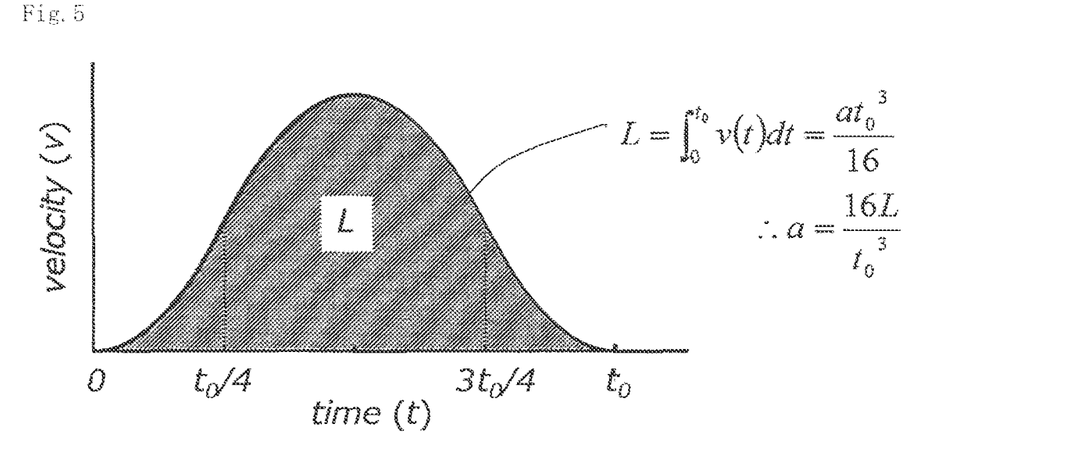
FIG. 5 is a view for illustrating a conveyance distance of the ladle in the first embodiment of the present invention.

As shown in FIG. 5, a conveyance distance L of the ladle 4 can be represented as an integrated value of v(t) in $0 \le t \le (t_0/2)$ i.e. $at_0^3/16$. Thus, the constant a is $16 L/t_0^3$, which can be determined from the conveyance distance L and the conveyance time $t_0$. Accordingly, the conveyance velocity v(t) can be easily set by the conveyance time $t_0$ and the conveyance distance L.

As above, according to the present embodiment, the conveyance velocity v(t) of the ladle 4 can be easily set by using parabolas in which acceleration and deceleration curves are in S shapes, and, in particular, the conveyance time to and the conveyance distance L can easily determine the conveyance velocity v(t). Thus, it is possible to set the conveyance velocity v(t) with less parameters and simpler formulae than in a liquid simulation.

For example, when the conveyance distance L is predetermined, the conveyance velocity v(t) according to the present embodiment can be determined by performing a conveyance experiment based on the formulae for the conveyance velocity v(t). In the experiment, the conveyance time to is gradually decreased, and the conveyance velocity v(t) is determined by setting the conveyance time to within a range in which liquid surface oscillations after the conveyance are tolerable.

On the other hand, when the conveyance time to is predetermined, to determine the conveyance velocity v(t), the conveyance distance L is decreased gradually in the conveyance experiment performed based on the formulae for the conveyance velocity v(t). The conveyance velocity v(t) is then determined by setting the conveyance distance L within a rang in which liquid surface oscillations after the conveyance are tolerable.

The formulae for the conveyance velocity v(t) are stored in the drive controller unit 11 in the casting line 1 so that the drive controller unit 11 drives and controls the motor 8 to convey the ladle 4 in accordance with the v(t). At that time, it is preferable that the drive controller unit 11 is connected to an input device, for example, so that the conveyance time to and the conveyance distance L can be changed from outside.

Alternatively, the velocity versus time curves of Formula 1 to Formula 3 may be determined by using a maximum value of the rate of change of acceleration $\alpha_{max}$ of the container at which the liquid surface oscillations after conveying the ladle 4 can be suppressed within the tolerable range. The rate of change of acceleration $\alpha_{max}$ can be calculated by time-differentiating the acceleration. That is, by making the rate of change of acceleration of the velocity versus time curve of Formula 1 equal to the maximum value $\alpha_{max}$, the ladle 4 can be conveyed at the maximum conveyance velocity (i.e. within the minimum conveyance time) while suppressing the liquid surface oscillations after conveying the ladle 4 within the tolerable range.

In Formula 1, the maximum value for the rate of change of acceleration is 2a, and thus the maximum value for the constant a can be calculated as $\alpha_{max}/2$ (hereinafter, represented as $a_{max}$). Also, at that time, from the relational expression shown in FIG. 5, the conveyance time $t_0$ for the ladle 4 to be conveyed for the conveyance distance L can be calculated as $(16 L/a_{max})^{1/3}$ (hereinafter, represented as $t_{0-min}$).

Using the calculated $a_{max}$ and $t_{0-min}$ to set the coefficients of Formula 1 to Formula 3 can set the velocity versus time curve in which the ladle 4 can be conveyed for the conveying distance L within a minimum time while suppressing liquid surface oscillations after conveying the ladle 4 within the tolerable range.

Also, from the relational expression shown in FIG. 5, the conveyance distance L for the ladle 4 to be conveyed within the conveyance time $t_0$ can be calculated as $a_{max} \cdot t_0^3/16$.

The rate of change of acceleration $\alpha_{max}$ may be predetermined from a calculation or an experiment in accordance with, for example, a shape and content of the container, an amount of content, the rigidity of the apparatus, and so on.

Second Embodiment

A method for conveying a liquid being contained in a container will be described, similarly to the first embodiment, by illustrating a conveyance of a ladle. The same notations will be used to illustrate the same device and structures as in the first embodiment.

Figure 6:
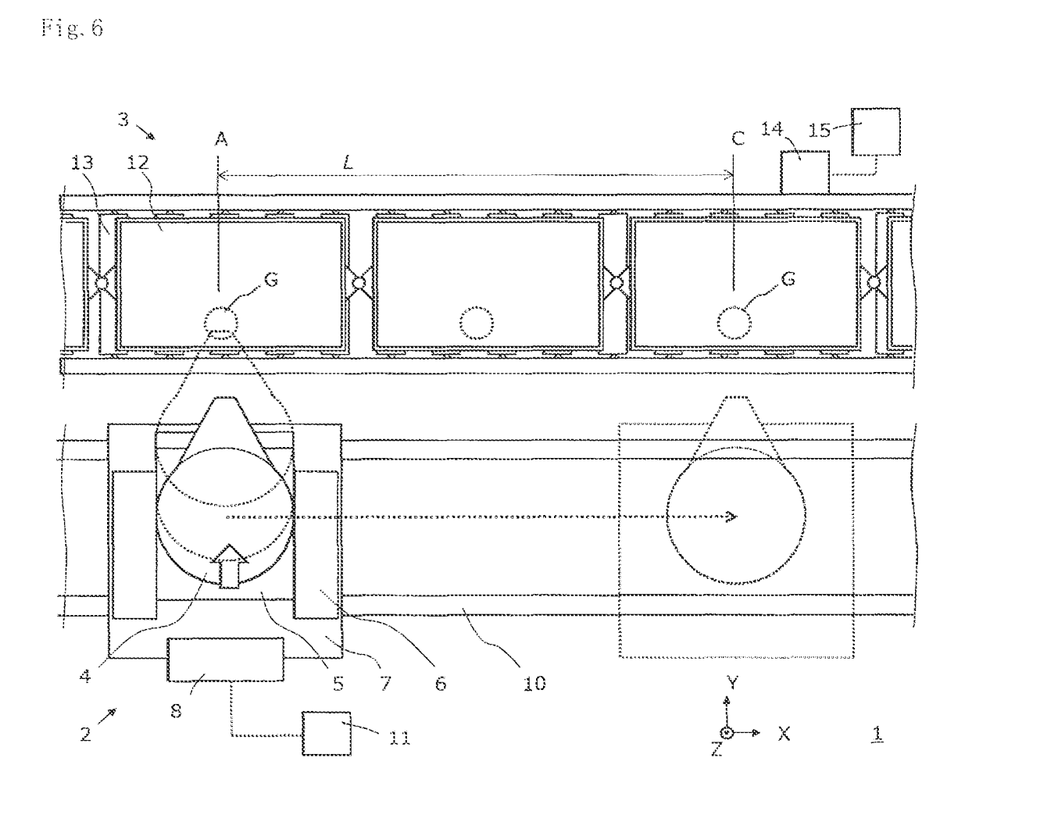
FIG. 6 is a schematic top view of a casting line for illustrating a second embodiment of the present invention.

As shown in FIG. 2, the first embodiment is described by illustrating a conveyance of the ladle 4 from the position A to B, which is a conveyance for a relatively short distance. However, in a case in which the ladle 4 is conveyed for a relatively long distance, such as from the position A to C as shown in FIG. 6, the conveyance velocity v(t) calculated by using the formulae according to the first embodiment may tend to become large, and, in order to suppress the liquid surface oscillations after the conveyance, it may become difficult to reduce the conveyance time $t_0$. In such a case, it is preferable that the formulae for the conveyance velocity v(t) according to the first embodiment are reviewed and determined as follows.

Figure 7:
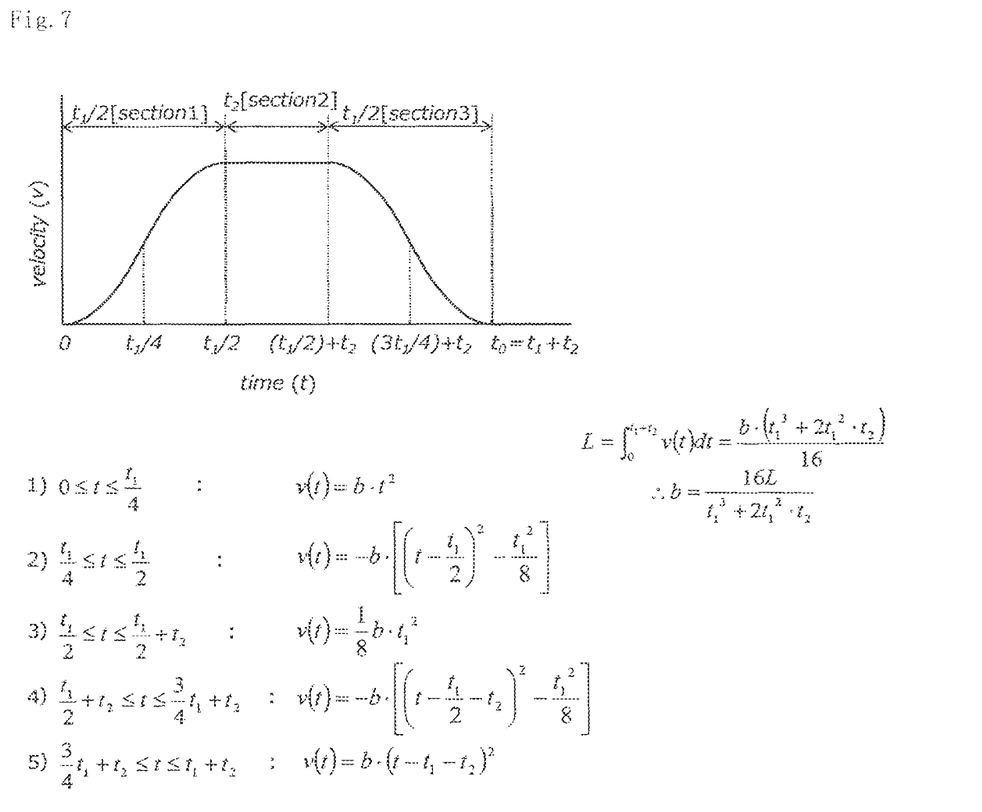
FIG. 7 is a view for illustrating a conveyance velocity of a ladle in the second embodiment of the present invention.

That is, the ladle 4 is accelerated in a horizontal direction, conveyed at a constant speed, and then decelerated. The conveyance velocity v(t) of the ladle 4 (the velocity in the X direction in the drawing), which is a function of time t, can be obtained, as shown in FIG. 7, by:

Formula 4 when $0 \le t \le (t_1/4)$ $$v(t) = b \cdot t^2 \qquad \text{[Formula 4]}$$

Formula 5 when $(t_1/4) \le t \le (t_1/2)$ $$v(t) = -b \cdot \left[ \left(t - \frac{t_1}{2}\right)^2 - \frac{t_1^2}{8} \right] \qquad \text{[Formula 5]}$$

Formula 6 when $(t_1/2) \le t \le (t_1/2) + t_2$ $$v(t) = \tfrac{1}{8} b \cdot t_1^2 \qquad \text{[Formula 6]}$$

Formula 7 when $(t_1/2) + t_2 \le t \le (3t_1/4) + t_2$ $$v(t) = -b \cdot \left[ \left(t - \frac{t_1}{2} - t_2\right)^2 - \frac{t_1^2}{8} \right] \qquad \text{[Formula 7]}$$

Formula 8 when $(3t_1/4) + t_2 \le t \le t_1 + t_2$ $$v(t) = b \cdot (t - t_1 - t_2)^2 \qquad \text{[Formula 8]}$$

wherein $t_1$ represents a total time for conveying the ladle 4 in acceleration and in deceleration, $t_2$ represents a time for conveying the ladle 4 at a constant speed (i.e. $t_1+t_2$ is the conveyance time), L represents the conveyance distance, and b represents a constant.

In other words, in a graph of conveyance velocity versus conveyance time, an upwardly convex parabola and a downwardly convex parabola having vertical symmetry are prepared in advance, the downwardly convex parabola and the upwardly convex parabola are smoothly connected to form an acceleration curve, the upwardly convex parabola and the downwardly convex parabola are smoothly connected to form a deceleration curve, and the conveyance velocity v(t) shown by the above formulae is obtained from smoothly connecting the acceleration curve with the deceleration curve via a horizontal straight line.

The conveyance velocity v(t) of the ladle 4 according to the present embodiment is obtained by smoothly connecting the downwardly convex parabola represented by Formula 4 and the upwardly convex parabola represented by Formula 5 at a connection point $t=t_0/4$ with a slope $2at_0$ (FIG. 7, section 1) and by smoothly connecting the upwardly convex parabola represented by Formula 7 and the downwardly convex parabola represented by Formula 8 at a connection point $t=3t_1/4+t_2$ with a slope $-2at_0$ (FIG. 7, section 3). Accordingly, the curves in an acceleration section ($0 \leq t \leq t_0/2$) and the deceleration section ($t_1/2+t_2 \leq t \leq t_1+t_2$) can be easily set to smooth S shapes so that liquid surface oscillations of the molten metal after conveying the ladle 4 can be suppressed.

Also, the conveyance velocity v(t) includes a constant speed section [$(t_1/2) \leq t \leq (t_1/2)+t_2$] (FIG. 7, section 2), which smoothly connects with the upwardly convex parabolas, between the acceleration section and the deceleration section. This can suppress the conveyance velocity v(t) from increasing excessively and also suppress the liquid surface oscillations of the molten metal after a short conveyance time ($t_1+t_2$) of conveying the ladle 4.

As shown in FIG. 7, the conveyance distance L of the ladle 4 can be represented as an integrated value of v(t) in $0 \leq t \leq (t_1+t_2)$ i.e. $b(t_1^3+2t_1^2t_2)/16$. Thus, the constant b is $16 L/(t_1^3+2t_1^2t_2)$, which can be determined from the total time $t_1$ of acceleration and deceleration, the constant speed time $t_2$, and the conveyance distance L of the ladle 4. Accordingly, the conveyance velocity v(t) of the ladle 4 can be easily set by the total time $t_1$ of acceleration and deceleration, the constant speed time $t_2$, and the conveyance distance L.

As above, according to the present embodiment, also in a case in which the conveying distance L is relatively long, the conveyance velocity v(t) of the ladle 4 at which liquid oscillations can be suppressed within a tolerable range can be easily set, and in particular, the total time $t_1$ of acceleration and deceleration, the constant speed time $t_2$, and the conveyance distance L can easily determine the conveyance velocity v(t).

For example, when the conveyance distance L is predetermined, the conveyance velocity v(t) can be determined by performing a conveyance experiment based on the formulae for the conveyance velocity v(t). In the experiment, the total time of acceleration and deceleration $t_1$ and the conveyance time at the constant speed $t_2$ are gradually decreased, and the conveyance velocity v(t) is determined by setting the total time of acceleration and deceleration $t_1$ and the constant speed conveyance time $t_2$ within a range in which liquid surface oscillations after the conveyance are tolerable.

On the other hand, when the conveyance time to is predetermined, to determine the conveyance velocity v(t), the conveyance distance L is decreased gradually in the conveyance experiment performed based on the formulae for the conveyance velocity v(t). The conveyance velocity v(t) is then determined by setting the conveyance distance L within a range in which liquid surface oscillations after the conveyance are tolerable.

Next, a conveyor control device that can achieve the method for conveying the ladle 4 described in the above embodiments will be exemplified.

Figure 8:
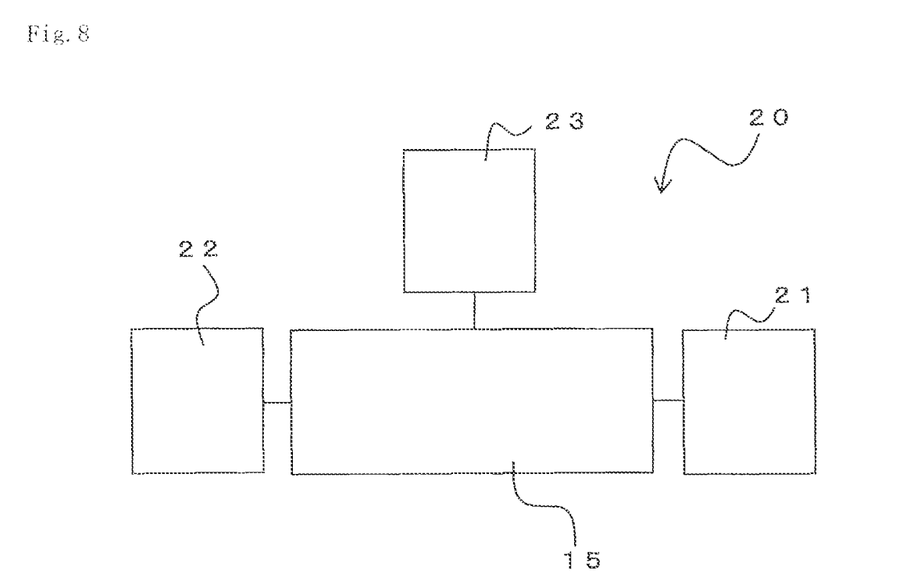
FIG. 8 is a block diagram of a conveyor control device 20.

As shown in FIG. 8, a conveyor control device 20 can be configured by a computer, for example, and can be connected with a storage unit 21 such as RAM or a hard disk drive. The storage unit 21 can store the above-mentioned Formulae 1 to 8 and can also store the maximum value of the rate of change of acceleration $\square_{max}$ at which liquid surface oscillations after conveying the ladle 4 can be suppressed within a tolerable range, a velocity limit $V_{max}$, which is a tolerable velocity that the conveyor device is capable of in conveying the ladle 4, and the like. Also, a conveyor control unit 15 can input information needed for the control into the storage unit 21 and, in reverse, can output various information needed for the control from the storage unit 21.

The conveyor control unit 15 can also perform various operations and control of various parts by means of a CPU or the like. Also, information necessary for the control can be stored in the storage unit 21 by using an input unit 22 such as a keyboard and, also, content of the control can be shown on an output unit 23 such as a display.

Figure 9:
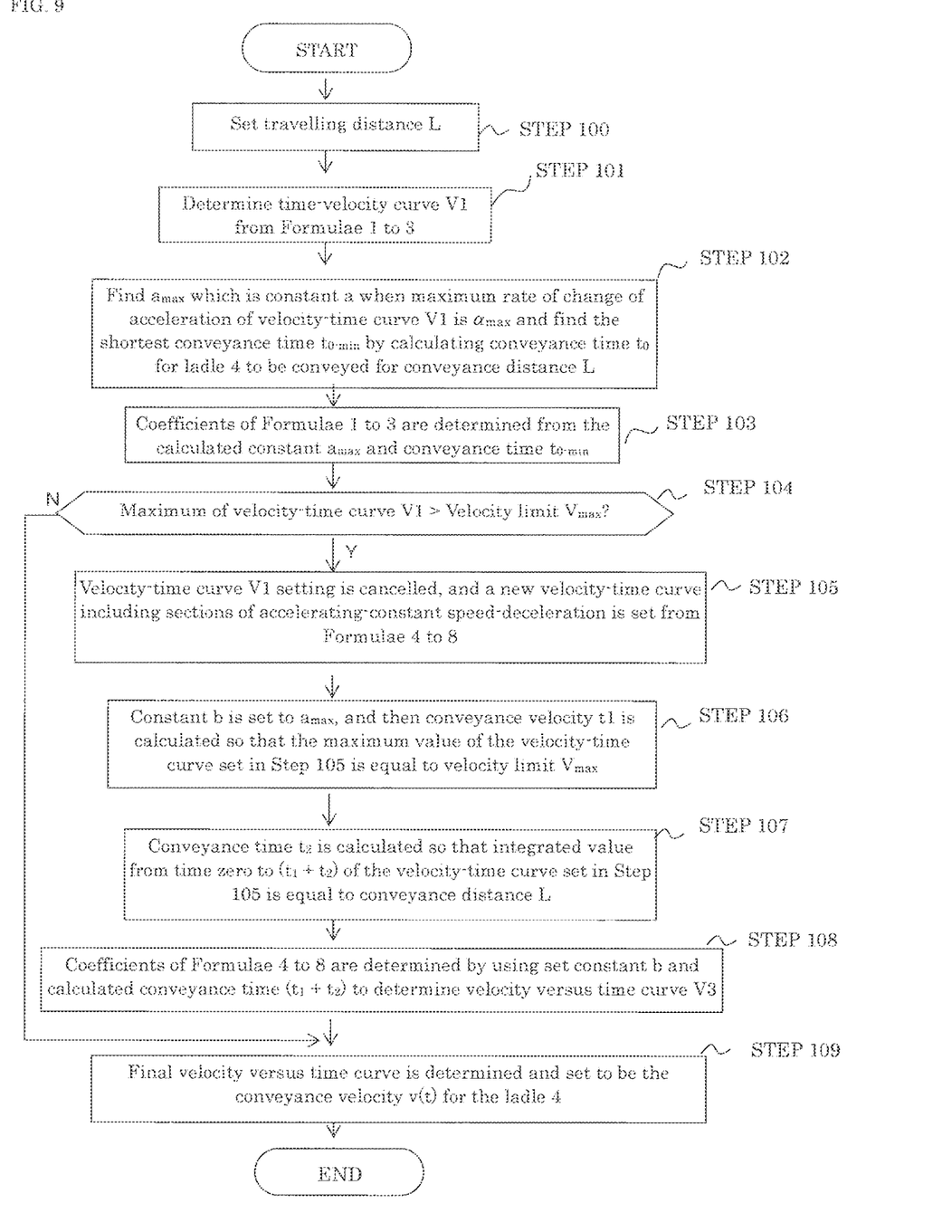
FIG. 9 is a flowchart showing a control process of the conveyor control device 20.

FIG. 9 is a flowchart showing a control process using the conveyor control device 20. In the control using the conveyor control device 20, the conveyor control unit 15 firstly sets the conveyance distance L of the ladle 4 (Step 100). Here, an operator may input the conveyance distance L through the input unit 22, or the conveyance distance L may be stored in the storage unit 21 in advance and the conveyor control unit 15 may read the conveyance distance L from the storage unit 21.

Figure 10A:
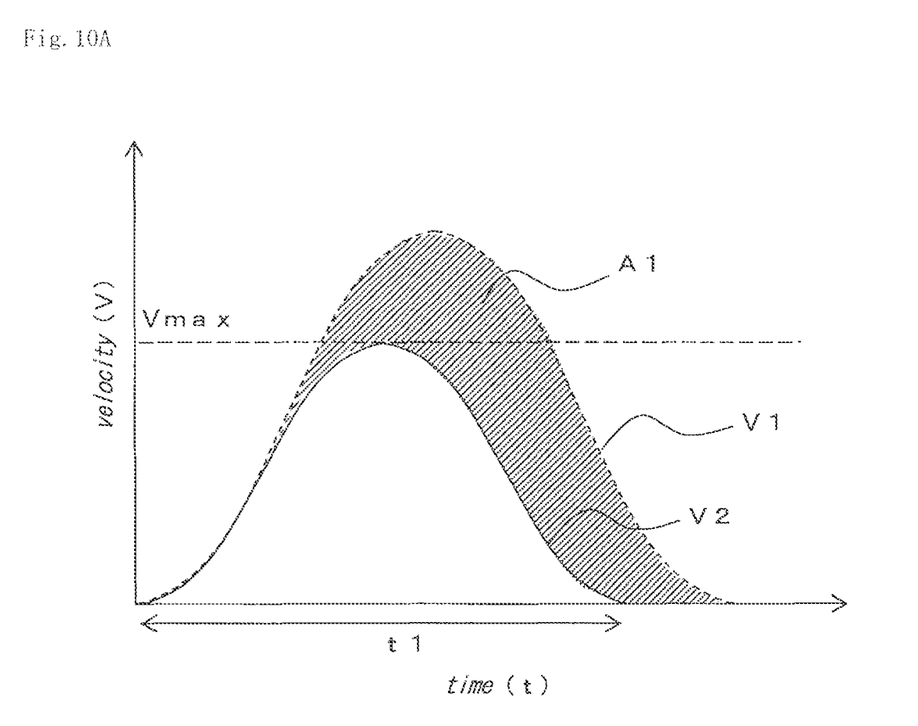
FIG. 10a shows velocity versus time curves V1 and V2.

Next, the conveyor control unit 15 sets a velocity versus time curve V1 as shown in FIG. 10a as the conveyance velocity v(t) of the ladle 4 using Formulae 1 to 3 (Step 101). Then, the conveyor control unit 15 reads the maximum value of the rate of change of acceleration $\alpha_{max}$, which has been stored in the storage unit 21, and calculates $a_{max}$, which is the constant a when the maximum rate of change of acceleration of the velocity versus time curve V1 (the time integration of Formula 1 in actuality) is $\alpha_{max}$, to find the shortest conveyance time $t_{0\text{-}min}$ by calculating the conveyance time $t_0$ for the ladle 4 to be conveyed for the conveyance distance L (Step 102). Then, coefficients of Formulae 1 to 3 are determined from the calculated constant $a_{max}$ and the conveyance time $t_{0\text{-}min}$ (Step 103).

Next, the conveyor control unit 15 reads the velocity limit $V_{max}$, which has been stored in the storage unit 21, and the velocity limit $V_{max}$ is compared with the maximum value of the velocity versus time curve V1 (the maximum value of Formula 2 in actuality), of which the coefficients have been calculated in Step 103 (Step 104). Here, if the conveyance velocity v(t) of the ladle 4, i.e. the maximum value of the velocity versus time curve V1, is equal to or less than the velocity limit $V_{max}$ (Step 104), the velocity versus time curve V1 using Formulae 1 to 3 is decided as the final velocity versus time curve for the ladle 4 and the conveyance velocity v(t) in accordance with this curve is determined as the conveyance velocity for the ladle 4 (Step 109). The velocity versus time curve V1 at this time, i.e. the conveyance velocity v(t), may be stored in the storage unit 21 so as to be read out as necessary.

Figure 10B:
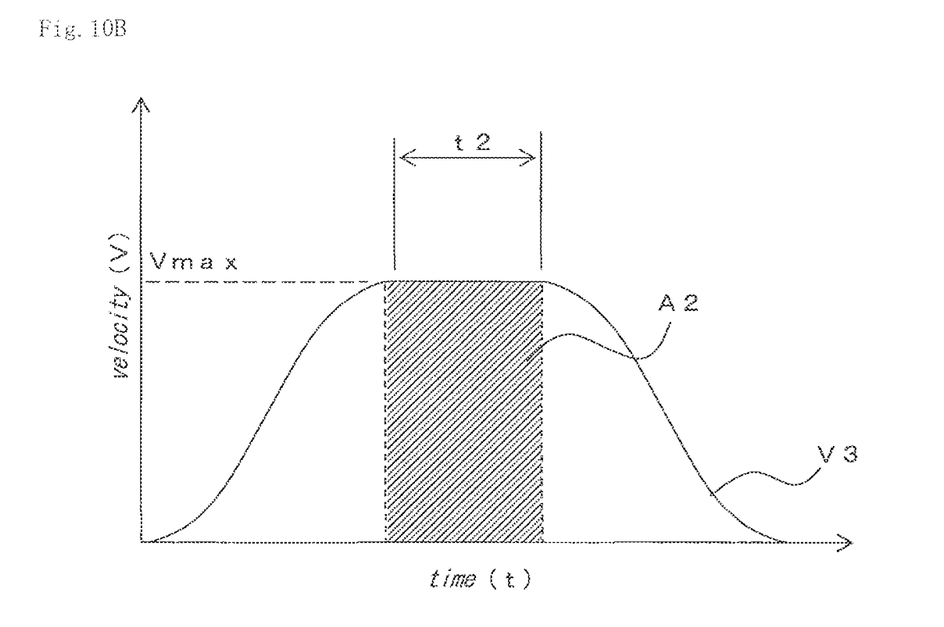
FIG. 10b shows a velocity versus time curve V3.

On the other hand, if the conveyance velocity v(t) of the ladle 4, i.e. the maximum value of the velocity versus time curve V1, is larger than the velocity limit $V_{max}$, the conveyor control unit 15 cancels the setting of the conveyance velocity v(t) of the ladle 4, i.e. the velocity versus time curve V1, and, by using Formulae 4 to 8, sets a new velocity versus time curve including the accelerating section—constant speed section—deceleration section as the conveyance velocity v(t) for the ladle 4 (Step 105). That is, to a velocity versus time curve such as V1 in which an acceleration section and a deceleration section are continuous, a constant speed section is newly added between the acceleration section and the deceleration section to form a new velocity versus time curve. FIG. 10b shows a velocity versus time curve V3, which is an example of a velocity versus time curve to be set.

Next, the conveyor control unit 15 calculates the constant b, t1, and t2 for Formulae 4 to 8 on a condition that the ladle 4 can be conveyed at a speed less than the velocity limit $V_{max}$ for the conveyance distance L in the shortest possible conveyance time.

That is, the constant b is set as $a_{max}$, which has been calculated in Step 102, so that the time $t_1$, which is the total time for the ladle 4 to be conveyed while being accelerated and decelerated, is minimum. Then, the conveyance velocity $t_1$ is calculated with a constant of Formula 6 as $V_{max}$ so that the maximum value of the velocity versus time curve set in Step 105 is equal to the velocity limit $V_{max}$ (Step 106).

The calculated conveyance time $t_1$, in regard to the velocity versus time curve determined in Step 105, is the total conveyance time wherein the constant b of the formula for the accelerating section and the decelerating section of the ladle 4 is $a_{max}$, the maximum value of the velocity versus time curve V3 is $V_{max}$, and the conveyance time during the constant speed section $t_2$ is zero, and is equivalent to the total conveyance time of a velocity versus time curve V2 in FIG. 10a.

Next, the conveyance time $t_2$ is calculated by using the already determined constant b (=$a_{max}$) and the already calculated conveyance time $t_1$ so that the integrated value of Formulae 4 to 8 from the time zero to the time $t_1+t_2$ is equal to the conveyance distance L (Step 107). The conveyance time $t_2$ is calculated so that an area between the velocity versus time curve V1 and the velocity versus time curve V2 in FIG. 10a (a shaded section A1) is equal to an area of the constant speed section of the velocity versus time curve V3 in FIG. 10b.

Then, the coefficients of Formulae 4 to 8 are determined with the set constant b (=$a_{max}$) and the calculated conveyance times $t_1$ and $t_2$ to determine the velocity versus time curve V3 shown in FIG. 10b (Step 108).

Lastly, the conveyor control unit 15 determines the velocity versus time curve V3 using Formulae 4 to 8 as the final velocity versus time curve for the ladle 4 and the conveyance velocity v(t) in accordance with this curve is determined as the conveyance velocity for the ladle 4 (Step 109). The velocity versus time curve V3 at this time, i.e. the conveyance velocity v(t), may be stored in the storage unit 21 so as to be read out as necessary.

Although some embodiments of the present invention have been described by illustrating a conveyance of a ladle containing molten metal in a casting line, the technical scope of the present invention is not limited thereto. The present invention can be also applied to, for example, a line of manufacturing food or chemicals, where it is required that a container containing a liquid material for making such product is conveyed while preventing the liquid from spilling out of the container and suppressing liquid surface oscillations after the conveyance.

DESCRIPTION OF NOTATIONS

1 . . . casting line
2 . . . pouring apparatus
3 . . . mold conveyor apparatus
4 . . . ladle
5 . . . fixing base
6 . . . tilting mechanism
7 . . . trolley
8 . . . motor
9 . . . wheel
10 . . . rail
11 . . . drive controller unit
12 . . . mold
13 . . . conveyor
14 . . . conveyor motor
15 . . . conveyor control unit
20 . . . conveyor device
21 . . . storage unit
22 . . . input unit
23 . . . display unit
M . . . molten metal
G . . . gate

What is claimed is:

1. A method for conveying a container, comprising:
   starting a conveyance by accelerating the container containing a liquid in a horizontal direction; and
   decelerating the container to complete the conveyance, wherein
   a conveyance velocity v(t) of the container, which is a function of time t, is represented by:
   Formula 1 when $0 \leq t \leq (t_0/4)$ $$v(t) = a \cdot t^2 \qquad \text{[Formula 1]}$$

Formula 2 when $(t_0/4) \leq t \leq (3t_0/4)$ $$v(t) = -a \cdot \left[ \left( t - \frac{t_0}{2} \right)^2 - \frac{t_0^2}{8} \right] \qquad \text{[Formula 2]}$$

Formula 3 when $(3t_0/4) \leq t \leq (t_0)$ $$v(t) = a \cdot (t - t_0)^2 \qquad \text{[Formula 3]}$$

wherein '$t_0$' represents a time for conveying the container and 'a' represents a constant, and the method further comprises determining the conveyance velocity v(t) of the container by using Formulae 1 to 3, and driving a motor that rotates a plurality of wheels of a trolley on which the container is placed and conveying the container in accordance with the determined conveyance velocity v(t) such that liquid surface oscillations after conveying the container are within a tolerable range.

2. The method for conveying a container according to claim 1, wherein:
   the conveyance velocity v(t) of the container, which is a function of time t, is also represented by:
   Formula 4 when $0 \leq t \leq (t_1/4)$ $$v(t) = b \cdot t^2 \qquad \text{[Formula 4]}$$

Formula 5 when $(t_1/4) \leq t \leq (t_1/2)$ $$v(t) = -b \cdot \left[\left(t - \frac{t_1}{2}\right)^2 - \frac{t_1^2}{8}\right]$$ [Formula 5]

Formula 6 when $(t_1/2) \leq t \leq (t_1/2) + t_2$ $$v(t) = \frac{1}{8} b \cdot t_1^2$$ [Formula 6]

Formula 7 when $(t_1/2) + t_2 \leq t \leq (3t_1/4) + t_2$ $$v(t) = -b \cdot \left[\left(t - \frac{t_1}{2} - t_2\right)^2 - \frac{t_1^2}{8}\right]$$ [Formula 7]

Formula 8 when $(3t_1/4) + t_2 \leq t \leq t_1 + t_2$ $$v(t) = b \cdot (t - t_1 - t_2)^2$$ [Formula 8]

wherein '$t_1$' represents a total time for conveying the container in acceleration and in deceleration, '$t_2$' represents a time for conveying the container at a constant speed, and 'b' represents a constant, and the method further comprises:

setting the conveyance time v(t) of the container by using Formulae 1 to 3 when a maximum value of the conveyance velocity v(t) among Formulae 1 to 3 is equal to or less than a velocity limit $V_{max}$ for the container, which is tolerable in conveying the container; and setting the conveyance time v(t) of the container by using Formulae 4 to 8 and calculating the conveyance time $t_1$ and the conveyance time $t_2$ from the constant a, the velocity limit $V_{max}$, and a conveyance distance L of the container where the constant b is equal to the constant a and the constant speed of Formula 6 is the velocity limit $V_{max}$ when the maximum value of the conveyance velocity v(t) among Formulae 1 to 3 is more than the velocity limit $V_{max}$.

3. The method for conveying a container according to claim 2, wherein the liquid is a molten metal and the container is a tilting ladle.

4. The method for conveying a container according to claim 1, wherein the constant a is determined $\alpha_{max}/2$ wherein $\alpha_{max}$ represents a maximum value of a rate of change of acceleration of the container at which liquid surface oscillations after conveying the container is suppressed within a tolerable range.

5. The method for conveying a container according to claim 4, wherein a conveyance distance of the container is L and a velocity limit of the container that is tolerable in conveying the container is $V_{max}$;

the conveyance velocity v(t) of the container is set by Formulae 1 to 3 when a maximum value of the conveyance velocity v(t) among Formula 1 to 3 is equal to or less than the velocity limit $V_{max}$; and when the maximum value of the conveyance velocity v(t) among Formulae 1 to 3 is more than the velocity limit $V_{max}$, a total time for conveying the container in acceleration and in deceleration is $t_1$, a time for conveying the container at a constant speed is $t_2$, and the constant is b, and, in addition, the conveyance velocity v (t) of the container, which is a function of time t, is represented by:

Formula 4 when $0 \leq t \leq (t_1/4)$ $$v(t) = b \cdot t^2$$ [Formula 4]

Formula 5 when $(t_1/4) \leq t \leq (t_1/2)$ $$v(t) = -b \cdot \left[\left(t - \frac{t_1}{2}\right)^2 - \frac{t_1^2}{8}\right]$$ [Formula 5]

Formula 6 when $(t_1/2) \leq t \leq (t_1/2) + t_2$ $$v(t) = \frac{1}{8} b \cdot t_1^2$$ [Formula 6]

Formula 7 when $(t_1/2) + t_2 \leq t \leq (3t_1/4) + t_2$ $$v(t) = -b \cdot \left[\left(t - \frac{t_1}{2} - t_2\right)^2 - \frac{t_1^2}{8}\right]$$ [Formula 7]

Formula 8 when $(3t_1/4) + t_2 \leq t \leq t_1 + t_2$ $$v(t) = b \cdot (t - t_1 - t_2)^2$$ [Formula 8]

wherein the conveyance velocity v(t) is set from the conveyance time $t_1$ and the conveyance time $t_2$ that are calculated from the constant a, the velocity limit $V_{max}$, and the conveyance distance L where the constant b is the constant a and the constant speed of Formula 6 is the velocity limit $V_{max}$.

6. The method for conveying a container according to claim 1, wherein the liquid is a molten metal and the container is a tilting ladle.

7. A conveyor control device for conveying a container, which starts conveying by accelerating the container containing a liquid in a horizontal direction and completes the conveyance after deceleration, the conveyor control device comprising:

a computer, wherein the computer stores a conveyance time $t_0$ of the container, a constant a, a maximum value of a rate of change of acceleration of the container $\alpha_{max}$ at which liquid surface oscillations after conveying the container are suppressed within a tolerable range;

the computer also stores a conveyance velocity of the container v(t), which is a function of time t as:

Formula 1 when $0 \leq t \leq (t_0/4)$ $$v(t) = a \cdot t^2$$ [Formula 1]

Formula 2 when $(t_0/4) \leq t \leq (3t_0/4)$ $$v(t) = -a \cdot \left[\left(t - \frac{t_0}{2}\right)^2 - \frac{t_0^2}{8}\right]$$ [Formula 2]

Formula 3 when $(3t_0/4) \leq t \leq (t_0)$ $$v(t) = a \cdot (t - t_0)^2$$ [Formula 3]

the computer is programmed to calculate the constant a from the stored rate of change of acceleration $\alpha_{max}$ and determine the conveyance velocity v(t) of the container by using Formulae 1 to 3; and the computer is programmed to drive a motor that rotates a plurality of wheels of a trolley on which the container is placed and convey the container in accordance with the determined conveyance velocity v(t) such that the liquid surface oscillations after conveying the container are within the tolerable range.

8. The conveyor control device unit for conveying a container according to claim 7, wherein the computer stores a conveyance distance L, a velocity limit $V_{max}$ for the container, which is tolerable in conveying the container, a total time $t_1$ for the container to be conveyed in acceleration and deceleration, a constant speed time $t_2$, and a constant b;

the computer also stores the conveyance velocity of the container v(t), which is a function of time t as:

Formula 4 when $0 \leq t \leq (t_1/4)$ $$v(t) = b \cdot t^2 \quad \text{[Formula 4]}$$

Formula 5 when $(t_1/4) \leq t \leq (t_1/2)$ $$v(t) = -b \cdot \left[ \left( t - \frac{t_1}{2} \right)^2 - \frac{t_1^2}{8} \right] \quad \text{[Formula 5]}$$

Formula 6 when $(t_1/2) \leq t \leq (t_1/2)+t_2$ $$v(t) = \frac{1}{8} b \cdot t_1^2 \quad \text{[Formula 6]}$$

Formula 7 when $(t_1/2)+t_2 \leq t \leq (3t_1/4)+t_2$ $$v(t) = -b \cdot \left[ \left( t - \frac{t_1}{2} - t_2 \right)^2 - \frac{t_1^2}{8} \right] \quad \text{[Formula 7]}$$

Formula 8 when $(3t_1/4)+t_2 \leq t \leq t_1+t_2$ $$v(t) = b \cdot (t - t_1 - t_2)^2 \quad \text{[Formula 8]}$$

and when a maximum value of the conveyance velocity v(t) among Formulae 1 to 3 is equal to or less than the velocity limit $V_{max}$, the computer is programmed to set the conveyance time v(t) of the container by using Formulae 1 to 3; and when the maximum value of the conveyance velocity v(t) among Formulae 1 to 3 is more than the velocity limit $V_{max}$, the computer is programmed to set the conveyance time v(t) of the container by using Formulae 4 to 8, and, in addition, the computer is programmed to calculate the conveyance time $t_1$ and the conveyance time $t_2$ from the constant a, the velocity limit $V_{max}$, and the conveyance distance L where the constant b is equal to the constant a and the constant speed of Formula 6 is the velocity limit $V_{max}$.

* * * * *